C. S. SHUTE.
Adjustable Stilts.
No. 196,941. Patented Nov. 6, 1877.
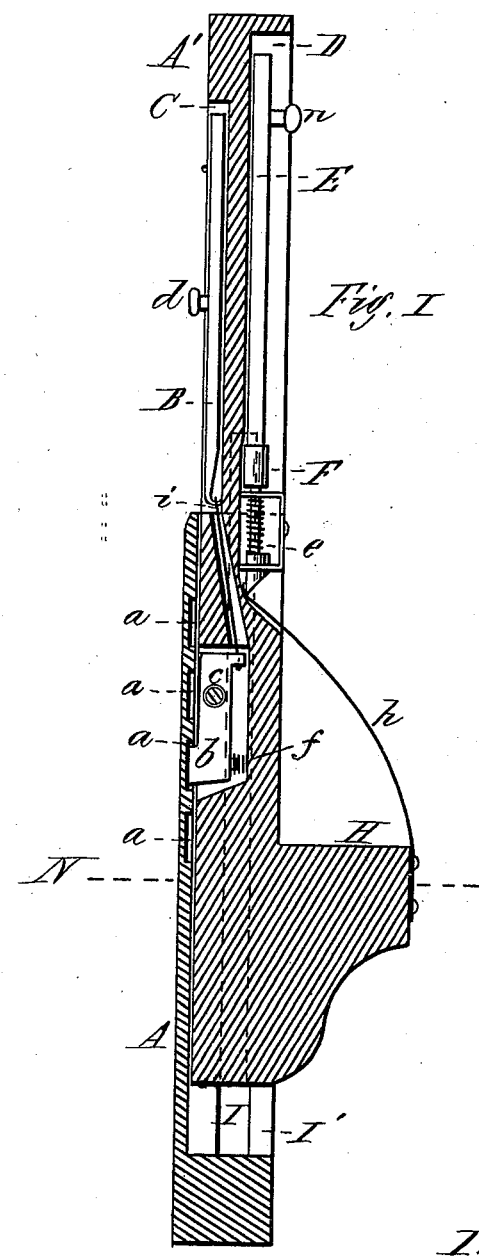
Witnesses.
T. A. Curtis,
C. E. Buckland
Inventor.
Charles S. Shute.
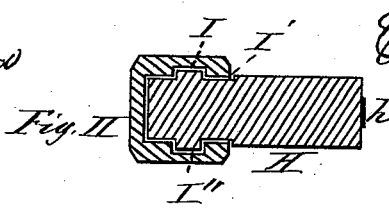

UNITED STATES PATENT OFFICE.

CHARLES S. SHUTE, OF SPRINGFIELD, MASSACHUSETTS.

IMPROVEMENT IN ADJUSTABLE STILTS.

Specification forming part of Letters Patent No. 196,941, dated November 6, 1877; application filed September 7, 1877.

*To all whom it may concern:*

Be it known that I, CHARLES S. SHUTE, of Springfield, in the State of Massachusetts, have invented a new and useful Improved Adjustable Stilt; and that the following is a full, clear, and exact description thereof, reference being had to the accompanying drawings, making a part of this specification, and to the letters of reference marked thereon.

My invention consists of a stilt made in two parts, one part having guides and sliding in grooves made in the other part, and provided with a latch to adjust and secure the two parts together, so that the foot-piece shall be at any desired distance from the ground; and it also consists of a latch-rod combined with and arranged in the handle to hold a spring-loop over the foot, or release it when desired, all which will be more fully hereinafter described.

Figure I is a longitudinal section of a stilt made according to my invention, and Fig. II is a transverse section of the same at line N of Fig. I.

In the drawings, A is the socket and lower part of the stilt, provided with a socket or channel, I', and side grooves I made therein, both extending a great portion of the length of the part A, and the recesses or indents $a$ $a$ in the bottom of the channel I' to any desired number.

A' is the shank or handle, and H the foot-piece made on its lower part, and the handle is provided with a catch, $b$, pivoted in a recess at $c$, with a spring, $f$, placed behind the catch to throw it outward; and the lower end of the rod B, sliding in a groove, C, made in the handle, is connected by a piece, $i$, to the rear side of the catch at its upper end, so that when the rod B is pulled upward by the knob $d$ the lower protruding end of the catch $b$ is drawn in, when, the part A' being moved a little up or down and the rod released, the catch $b$ will snap into any of the other recesses $a$, as may be desired, to make the stilt longer or shorter, or the foot-piece H nearer to or farther from the ground. In moving it up or down, the guides I'', moving in the grooves I, keep the handle or part A' in proper position in the channel I'.

In the opposite side of the handle from the rod B is a groove, D, in which slides a rod, E, held downward by a spring, $e$; and a spring-loop, $h$, is secured to the outside of the foot-piece, H, which is sufficiently long to be bent inward over the foot-piece and its upper end secured inside the latch-rod E at its lower end. The object of this spring-loop $h$ is to assist in securing the foot to the foot-piece H, and it may be released, and the spring will fly outward instantly if there is danger of falling, by pulling up the latch-rod E by its knob $n$, and, when released, the latch-rod E will quickly move down to place again.

This stilt may be adjusted to give the foot-piece H any desired height above the ground very quickly, and is strong and durable in its operation.

I am aware that adjustable stilts have heretofore been made in which the foot-piece is adjusted to the desired height by means of a pivoted weighted dog made to engage with rods forming a rack in the staff, and I do not claim the same, nor any part thereof.

Having thus described my invention, what I claim as new is—

1. The combination, in an adjustable stilt, of the socket-piece A, provided with the recesses $a$ $a$, and the sliding piece A', provided with the pivoted catch $b$, spring $f$, and rod B, all constructed and arranged substantially as herein described.

2. The combination, in a stilt, of the spring-loop $h$, arranged with and secured to the foot-piece, and the latch-rod and spring $e$, arranged in the handle, to secure and release the said loop when desired, substantially as described.

CHARLES S. SHUTE.

Witnesses:
 T. A. CURTIS,
 C. E. BUCKLAND.